(12) United States Patent
Tanaka et al.

(10) Patent No.: US 9,581,199 B2
(45) Date of Patent: Feb. 28, 2017

(54) FULCRUM BEARING DEVICE FOR PULLEY ARM

(71) Applicants: Tadahisa Tanaka, Shizuoka (JP); Seiji Sato, Shizuoka (JP); Takehiro Takano, Shizuoka (JP)

(72) Inventors: Tadahisa Tanaka, Shizuoka (JP); Seiji Sato, Shizuoka (JP); Takehiro Takano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/438,233

(22) PCT Filed: Oct. 23, 2013

(86) PCT No.: PCT/JP2013/078697
§ 371 (c)(1),
(2) Date: Apr. 24, 2015

(87) PCT Pub. No.: WO2014/065320
PCT Pub. Date: May 1, 2014

(65) Prior Publication Data
US 2015/0275976 A1    Oct. 1, 2015

(30) Foreign Application Priority Data

Oct. 25, 2012 (JP) ................... 2012-235743
Oct. 26, 2012 (JP) ................... 2012-236297
Nov. 13, 2012 (JP) ................... 2012-249338

(51) Int. Cl.
*F16C 17/02* (2006.01)
*F16C 33/74* (2006.01)
(Continued)

(52) U.S. Cl.
CPC ............... *F16C 33/74* (2013.01); *F16H 7/12* (2013.01); *F16H 7/1281* (2013.01); *F16C 2361/63* (2013.01); *F16H 2007/0893* (2013.01)

(58) Field of Classification Search
CPC ........... F16C 17/02; F16C 17/10; F16C 11/04; F16C 33/74; F16C 33/7876; F16C 2361/63; F16H 7/12; F16H 7/1281
See application file for complete search history.

(56) References Cited

U.S. PATENT DOCUMENTS

| 790,140 A | 5/1905 | Krepp |
| 2,626,839 A * | 1/1953 | Creson ................. F16C 33/74 |
| | | 277/572 |

(Continued)

FOREIGN PATENT DOCUMENTS

| DE | 10 2005 031 593 | 1/2007 |
| EP | 2 270 348 | 1/2011 |

(Continued)

OTHER PUBLICATIONS

Extended European Search Report issued Mar. 1, 2016 in corresponding European Application No. 13849760.7.
(Continued)

*Primary Examiner* — Alan B Waits
(74) *Attorney, Agent, or Firm* — Wenderoth, Lind & Ponack, L.L.P.

(57) ABSTRACT

In a fulcrum bearing device for a pulley arm, a sleeve is inserted in a shaft hole formed in a boss portion of a pulley arm, washers are fitted on the outer peripheries of small diameter tube portions formed at the respective end portions of the sleeve, and the sleeve is fixed to an engine block by means of a bolt inserted through the sleeve and tightened, so that the pulley arm is pivotally supported. The shaft hole is formed at its respective end portions with seal receiving recesses having large diameters. Each seal member includes a cylindrical portion provided on its outer peripheral portion and press-fitted in the seal receiving recess, and a radial lip (Continued)

extending obliquely inwardly and provided on the inner periphery of the seal member. The distal end portions of the radial lips are kept in elastic contact with the outer diameter surface of the sleeve.

5 Claims, 12 Drawing Sheets

(51) Int. Cl.
*F16H 7/12* (2006.01)
*F16H 7/08* (2006.01)

(56) References Cited

U.S. PATENT DOCUMENTS

| | | | | | |
|---|---|---|---|---|---|
| 2,683,637 | A * | 7/1954 | Skillman, Jr. | ............ | F16C 17/02 384/202 |
| 3,117,796 | A * | 1/1964 | Liebig | ............ | F16C 33/74 277/574 |
| 3,825,272 | A * | 7/1974 | Townsend | ............ | F16J 15/3456 277/317 |
| 3,848,881 | A * | 11/1974 | Ginn | ............ | F16J 15/3248 277/572 |
| 3,904,299 | A * | 9/1975 | Loonis | ............ | F16C 11/045 277/500 |
| 3,951,234 | A * | 4/1976 | Fisher | ............ | F16C 33/103 184/41 |
| 4,015,883 | A * | 4/1977 | Taylor | ............ | F16C 33/7876 277/573 |
| 4,323,287 | A * | 4/1982 | Stella | ............ | F16C 13/006 384/148 |
| 4,789,252 | A * | 12/1988 | Dreschmann | ............ | B60B 35/18 277/353 |
| 4,838,840 | A * | 6/1989 | Mutoh | ............ | F16H 7/1281 474/110 |
| 5,509,737 | A * | 4/1996 | Waskiewicz | ............ | F16C 17/10 384/130 |
| 5,553,962 | A * | 9/1996 | Eustache | ............ | B60S 1/24 15/250.32 |
| 5,593,362 | A * | 1/1997 | Mizuta | ............ | F16H 57/082 475/348 |
| 5,758,541 | A * | 6/1998 | Shibuya | ............ | F16F 7/023 384/485 |
| 5,975,547 | A * | 11/1999 | Stroh | ............ | B62D 7/18 280/93.512 |
| 6,039,664 | A * | 3/2000 | Schmid | ............ | F16C 11/04 474/101 |
| 6,042,272 | A * | 3/2000 | Nagase | ............ | F16C 33/7859 384/486 |
| 6,485,183 | B1 * | 11/2002 | Imai | ............ | F16C 9/04 384/294 |
| 6,676,132 | B1 * | 1/2004 | Takebayashi | ............ | F16J 15/002 277/549 |
| 6,712,519 | B2 * | 3/2004 | Zauner | ............ | F16C 9/02 384/486 |
| 6,783,129 | B2 * | 8/2004 | Akita | ............ | E02F 9/006 277/349 |
| 7,367,739 | B2 * | 5/2008 | Brock | ............ | F16J 15/3236 403/288 |
| 7,399,122 | B2 * | 7/2008 | Fujita | ............ | F16C 9/02 384/276 |
| 7,513,690 | B2 * | 4/2009 | Yamamoto | ............ | F16C 33/74 277/553 |
| 7,758,249 | B2 * | 7/2010 | Shimizuya | ............ | F16C 19/186 384/484 |
| 7,775,922 | B2 * | 8/2010 | Tanaka | ............ | F16C 33/74 474/110 |
| 7,901,140 | B2 * | 3/2011 | Petri | ............ | F16C 11/04 384/130 |
| 7,954,999 | B2 * | 6/2011 | Singer | ............ | F16C 11/04 384/276 |
| 8,070,362 | B2 * | 12/2011 | New | ............ | F16C 17/02 384/114 |
| 8,308,370 | B2 * | 11/2012 | Nakagawa | ............ | F16C 33/7853 384/478 |
| 8,596,870 | B2 * | 12/2013 | Akita | ............ | E02F 9/006 277/562 |
| 8,708,568 | B2 * | 4/2014 | Morishige | ............ | F16C 17/04 384/147 |
| 9,011,009 | B2 * | 4/2015 | Trotter | ............ | B60G 15/067 384/140 |
| 2003/0102635 | A1 * | 6/2003 | Akita | ............ | E02F 9/006 277/549 |
| 2005/0196082 | A1 * | 9/2005 | Asfour | ............ | F16C 33/74 384/147 |
| 2006/0052193 | A1 | 3/2006 | Davis et al. | | |
| 2008/0193068 | A1 * | 8/2008 | Petri | ............ | F16C 11/04 384/140 |
| 2009/0008882 | A1 | 1/2009 | Peschke et al. | | |
| 2010/0201072 | A1 * | 8/2010 | Wians | ............ | F16C 33/74 277/307 |
| 2010/0247014 | A1 * | 9/2010 | Ohmori | ............ | F16C 19/186 384/486 |
| 2011/0019949 | A1 * | 1/2011 | Akita | ............ | E02F 9/006 384/147 |
| 2011/0224039 | A1 * | 9/2011 | Huss | ............ | F16C 35/02 474/133 |
| 2012/0256342 | A1 * | 10/2012 | Masuda | ............ | F16J 15/328 264/233 |
| 2015/0016761 | A1 * | 1/2015 | Akita | ............ | E02F 9/006 384/125 |
| 2015/0098669 | A1 * | 4/2015 | Catalano | ............ | B23P 19/04 384/484 |
| 2016/0003357 | A1 * | 1/2016 | Kanzaki | ............ | F16C 33/7876 277/351 |
| 2016/0010692 | A1 * | 1/2016 | Yonekura | ............ | F16C 33/723 384/489 |

FOREIGN PATENT DOCUMENTS

| | | |
|---|---|---|
| JP | 60-114372 | 8/1985 |
| JP | 3-78169 | 8/1991 |
| JP | 10-089427 | 4/1998 |
| JP | 2006-214509 | 8/2006 |
| JP | 2009-103142 | 5/2009 |
| JP | 2009-275737 | 11/2009 |
| JP | 2010-255698 | 11/2010 |
| JP | 2011-058528 | 3/2011 |
| JP | 2011-196552 | 10/2011 |
| JP | 2011-231781 | 11/2011 |

OTHER PUBLICATIONS

International Search Report issued Jan. 28, 2014 in International (PCT) Application No. PCT/JP2013/078697.
Written Opinion of the International Searching Authority issued Jan. 28, 2014 in International (PCT) Application No. PCT/JP2013/078697 (with English translation).
Office Action issued Jul. 5, 2016 in corresponding Japanese Application No. 2012-249338, with English translation.
Office Action issued Jun. 21, 2016 in corresponding Japanese Application No. 2012-235743, with English translation.

* cited by examiner (a)

(b)

(a)

(b)

(a) PRIOR ART (b) PRIOR ART

# FULCRUM BEARING DEVICE FOR PULLEY ARM

TECHNICAL FIELD

The present invention relates to a fulcrum bearing device for a pulley arm supporting a tension pulley for adjusting the tension of a belt.

BACKGROUND ART

Generally, in a belt transmission device for driving engine accessories such as an alternator, a compressor for an air conditioner, and a water pump, a hydraulic auto-tensioner is coupled to a pivotable pulley arm supporting a tension pulley, the pulley arm is biased by adjusting force applied to the pulley arm from the hydraulic auto-tensioner such that the tension pulley is pressed against a belt, and the tension change of the belt is absorbed by the hydraulic auto-tensioner, thereby keeping the tension of the belt constant.

Since such a belt transmission device is attached to the exterior of an engine, foreign objects such as dust or muddy water might go into a fulcrum bearing portion about which the pulley arm pivots. If such foreign objects go into the fulcrum bearing portion, it resists the pivoting motion of the pulley arm or it extremely shortens the service life of the bearing portion. Therefore, it is necessary to take a countermeasure in the fulcrum bearing portion so as to prevent foreign objects from going into the fulcrum bearing portion.

The below-identified patent document 1 discloses a fulcrum bearing device for a pulley arm in which a countermeasure is taken so as to prevent foreign objects from going into the bearing device.

In the fulcrum bearing device for a pulley arm disclosed in U.S. Pat. No. 7,901,140, a sleeve configured to function as a fulcrum shaft is inserted in a shaft hole of a tubular boss portion connected to the pulley arm, sliding bearings are incorporated between the shaft hole and the outer diameter surface of the sleeve so as to support the sleeve and the pulley arm such that the sleeve and the pulley arm are rotatable relative to each other, washers are fitted on small diameter tube portions formed at the respective end portions of the sleeve, a bolt inserted through the sleeve is screwed into an engine block and tightened, and the sleeve and the washers are fixed in position by means of the bolt, thereby supporting the pulley arm such that the pulley arm is pivotable about the sleeve.

As illustrated in FIG. 15(a), an annular recess 62 having a diameter larger than the diameter of a shaft hole 61 is formed at each end of the shaft hole 61 of a boss portion 60, each seal member 63 is incorporated in the corresponding recess 62, an annular base portion 63a of the seal member 63 is fitted on each end portion of a sleeve 64, a pair of seal lips 63b, 63c extending obliquely away from each other are integrally connected with each of the base portions 63a, the distal end portion of each of the seal lips 63b is in kept in elastic contact with the side surface of the corresponding recess 62, and the distal end portion of each of the seal lips 63c is kept in elastic contact with the inner side surface of a washer 65. Therefore, the seal members 63 prevent foreign objects such as dust or muddy water from going into the shaft hole 61 of the boss portion 60 in which sliding bearings 66 and the sleeve 64 are incorporated.

SUMMARY OF THE INVENTION

Problems to be Solved by the Invention

In the fulcrum bearing device disclosed in U.S. Pat. No. 7,901,140, when the vibration of a belt is transmitted to a pulley arm so that the pulley arm pivots at a high speed, heat tends to be generated due to contact friction in the sliding bearings 66, and thus the interior of a fulcrum bearing about which the pulley arm pivots tends to be made a high temperature. As illustrated in FIG. 15(b), if each of the seal lips 63b is elastically deformed in the outward direction due to the rise of internal pressure caused by the change of temperature in the interior of the fulcrum bearing, and thus is moved away from the side surface of the corresponding recess 62, it is impossible to keep the seal lips 63b in close contact with the side surface of the respective recesses 62, and thus to prevent foreign objects from going inside.

It is an object of the present invention to provide a fulcrum bearing device for a pulley arm in which excellent seal performance can be secured, even when pressure has risen due to the change of temperature in the interior of the fulcrum bearing.

Means for Solving the Problems

In order to achieve the above object, the present invention provides a fulcrum bearing device for a pulley arm wherein a sleeve is inserted in a shaft hole formed in a boss portion of the pulley arm, wherein washers are attached to two respective end portions of the sleeve so as to be opposed to two respective end surfaces of the boss portion in an axial direction, wherein the sleeve is fixed in position by means of a bolt which is inserted through the sleeve, screwed into a member to which the pulley arm is attached, and tightened, whereby the pulley arm is pivotally supported, wherein the shaft hole of the boss portion is formed, at two respective end portions of the shaft hole, with seal receiving recesses having diameters larger than a diameter of the shaft hole, and wherein seal members are incorporated in the respective seal receiving recesses, so as to prevent a foreign object from going into the boss portion from outside, characterized in that each of the seal members is made of an elastic material, and comprises a cylindrical portion press-fitted on an inner diameter surface of the seal receiving recess, an inwardly extending annular portion integrally connected with an outer side end of the cylindrical portion, and a tapered radial lip extending obliquely inwardly from an inner periphery of the annular portion inside of the cylindrical portion, and having a distal end portion kept in elastic contact with an outer diameter surface of the sleeve The seal members incorporated into the respective seal receiving recesses each comprises the cylindrical portion press-fitted onto the inner diameter surface of the seal receiving recess, the annular portion integrally connected with the outer side end of the cylindrical portion, and the tapered radial lip extending obliquely inwardly from the inner periphery of the annular portion inside of the cylindrical portion, and having the distal end portion kept in elastic contact with the outer diameter surface of the sleeve. As a result thereof, when pressure rises inside of the boss portion due to the rise of temperature inside of the boss portion about which the pulley arm pivots, the radial lips are elastically deformed so as to be radially compressed, thereby more strongly bringing the distal ends of the respective radial lips into contact with the outer diameter surface of the sleeve. Therefore, it is possible to secure excellent seal performance in the contact portions of the respective radial seal lips.

If the annular portion of each of the seal members has an outer side surface provided, on an inner peripheral portion of the outer side surface, with an axial lip extending obliquely outwardly and having a distal end portion kept in elastic contact with an inner side surface of a corresponding one of the washers, when the temperature inside of the boss portion lowers and thus the pressure inside of the boss portion drops below the external pressure, though the radial lips are elastically deformed radially outwardly so that the contact pressure of the radial lips lowers, at this time, the axial lips are elastically deformed toward the respective washers by external pressure, so as to be strongly brought into contact with the inner side surfaces of the respective washers. Therefore, even when the pressure inside of the boss portion has become lower than the external pressure, it is possible to secure excellent seal performance.

If the seal members are each provided with a seal metal core having an L-shaped section, and including a cylindrical portion having an outer diameter surface and an end surface which are covered by the cylindrical portion of a corresponding one of the seal members, and an inwardly extending flange provided at one end of the cylindrical portion of the seal metal core, and having an outer side surface covered by the annular portion of the corresponding one of the seal members, it is possible to reinforce the seal members due to the respective seal metal cores. Therefore, it is possible to reliably mount the seal members, and also to keep the seal members stably mounted.

In the fulcrum bearing device according to the present invention, if each of the washers is formed with an annular recessed step in the inner side surface of the washer at an outer peripheral portion thereof opposed to a corresponding one of the end surfaces of the boss portion, the annular recessed step defining, inside the annular recessed step, a circular protrusion fitted in a corresponding one of the seal receiving recesses, wherein the annular recessed steps have side surfaces opposed to the respective end surfaces of the boss portion with minute gaps defined between the respective side surfaces and the respective end surfaces of the boss portion, and configured to restrict an axial movement of the pulley arm, and wherein the axial lips are kept in elastic contact with side surfaces of the respective circular protrusions, the side surfaces of the circular protrusions with which the respective axial lips come into elastic contact are incorporated into the boss portion so as to be located axially inwardly of the respective end surfaces of the boss portion, and a distance is secured so as to define each of the minute gaps. As a result thereof, since foreign objects are less likely to adhere to the side surfaces of the circular protrusions so that the hindrance of seal performance is less likely to occur, it is possible to maintain excellent seal performance for a long period of time.

If each of the axial seal lips is configured such that when the axial lip is in a natural state, a distal end outer diameter of the axial lip is smaller than an inner diameter of the cylindrical portion of the seal metal core, and when the axial lip is kept in elastic contact with the side surface of the circular protrusion, the distal end outer diameter of the axial lip is smaller than an outer diameter of the circular protrusion, when the fulcrum bearing device is assembled, it is possible to prevent the distal ends of the axial lips from getting caught between the boss portion and the respective washers opposed to the boss portion, and thus to prevent the distal ends thereof from being damaged.

If each of the seal receiving recesses has an open end formed with a tapered surface at an inner peripheral portion of the open end such that a gap is defined between the tapered surface and an outer peripheral edge of a corresponding one of the circular protrusions, even when the boss portion moves in the axial direction within the range of the minute gaps, defined between the washers and the respective tapered surfaces, while whirling due to looseness in a pivotal direction, the outer peripheries of the circular protrusions do not come into contact with the inner diameter surfaces of the respective seal receiving recesses. Therefore, the pulley arm can pivot.

Since the radial lips come into frictional contact with the outer diameter surface of the sleeve, and the axial lips also come into frictional contact with the inner side surfaces of the respective washers, it is preferable that the seal members by which respective open end portions of the boss portion are sealed are each made of a synthetic rubber having excellent wear resistance, such as nitrile rubber, hydrogenated nitrile rubber, ACM rubber, silicon rubber or fluororubber.

Effects of the Invention

In the present invention, as described above, the seal members incorporated in the respective seal receiving recesses are each provided with a cylindrical portion press-fitted on the inner diameter surface of the seal receiving recess, an inwardly extending annular portion integrally connected with the outer side end of the cylindrical portion, and a tapered radial lip extending obliquely inwardly from the inner periphery of the annular portion inside of the cylindrical portion, and having a distal end portion kept in elastic contact with the outer diameter surface of the sleeve. Therefore, when the temperature inside of the boss portion rises and thus the pressure inside of the boss portion rises, the radial lips are elastically deformed so as to be radially compressed, thereby more strongly bringing the distal ends of the respective radial lips into close contact with the outer diameter surface of the sleeve. As a result thereof, it is possible to secure excellent seal performance in the contact portions of the respective radial seal lips, and thus to stably prevent foreign objects from going inside.

DETAILED DESCRIPTION OF THE INVENTION

Figure 1:
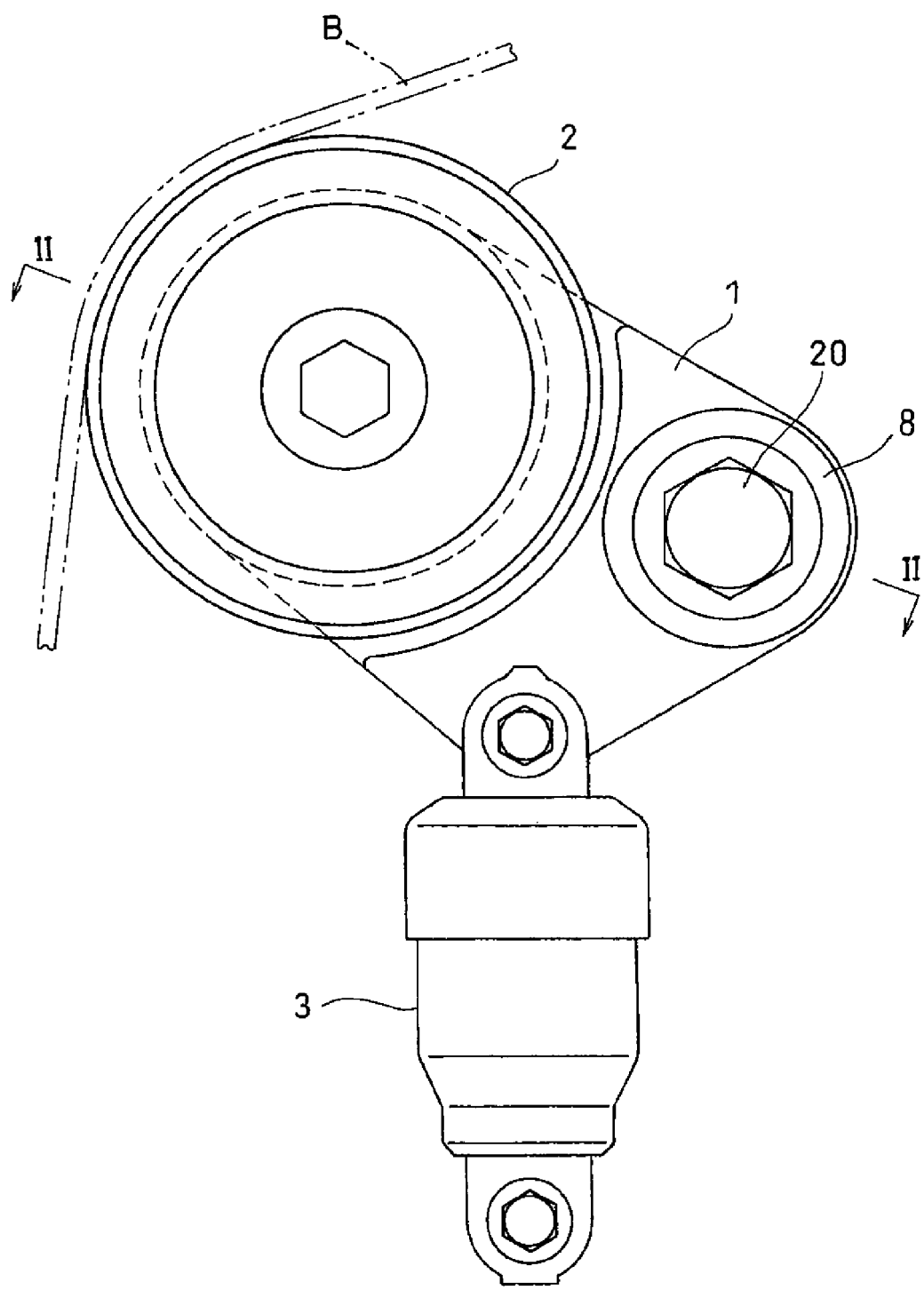
FIG. 1 is a front view of a belt transmission device for driving engine accessories in which a fulcrum bearing device for a pulley arm according to the present invention is used.

An embodiment of the present invention is now described with reference to the drawings. FIG. 1 illustrates a belt transmission device for driving engine accessories. This belt transmission device includes a pivotally supported pulley arm 1, a tension pulley 2 rotatably supported on the pulley arm 1 at its end portion remote from the pivot point of the pulley arm 1, and a hydraulic auto-tensioner 3 which biases the pulley arm 1 such that the tension pulley 2 is pressed against a belt B.

Figure 2:
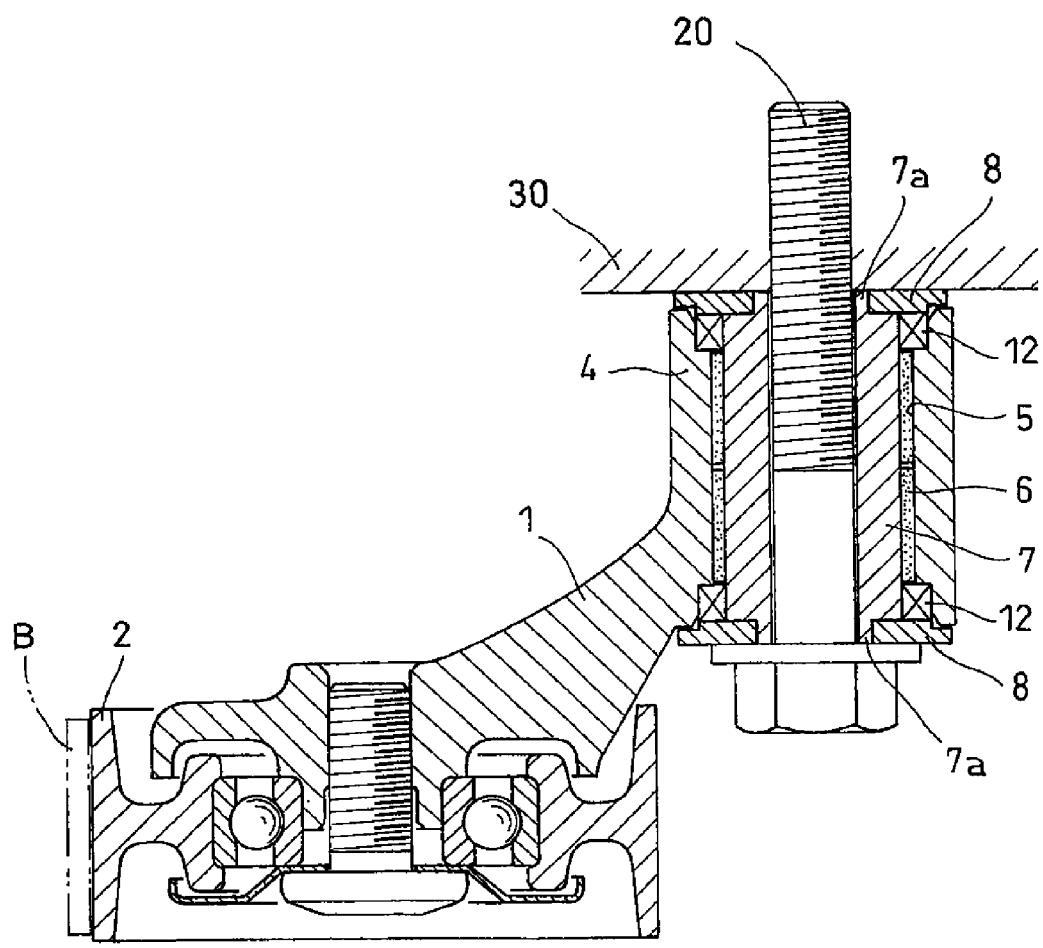
FIG. 2 is a sectional view taken along the line II-II of FIG. 1.

As illustrated in FIG. 2, the pulley arm 1 includes a tubular boss portion 4 formed with a shaft hole 5 in which sliding bearings 6 are incorporated in which a sleeve 7 made of metal is inserted.

The sleeve 7 has an axial length longer than the axial length of the boss portion 4, and includes small diameter tube portions 7a provided at the respective end portions of the sleeve 7 so as to be disposed outwardly of the respective ends of the boss portion 4. Washers 8 are fitted on the outer peripheries of the respective small diameter tube portions 7a. The washers 8 are made of metal, and plated so as to be made corrosion-resistant.

By tightening a bolt 20 inserted into the sleeve 7 and screwed into an engine block 30 to which the pulley arm 1 is intended to be attached, the sleeve 7 and the washers 8 are fixed to the engine block 30. As a result thereof, the sleeve 7 and the washers 8 function as a fulcrum shaft about which the pulley arm 1 is pivotable.

Figure 3:
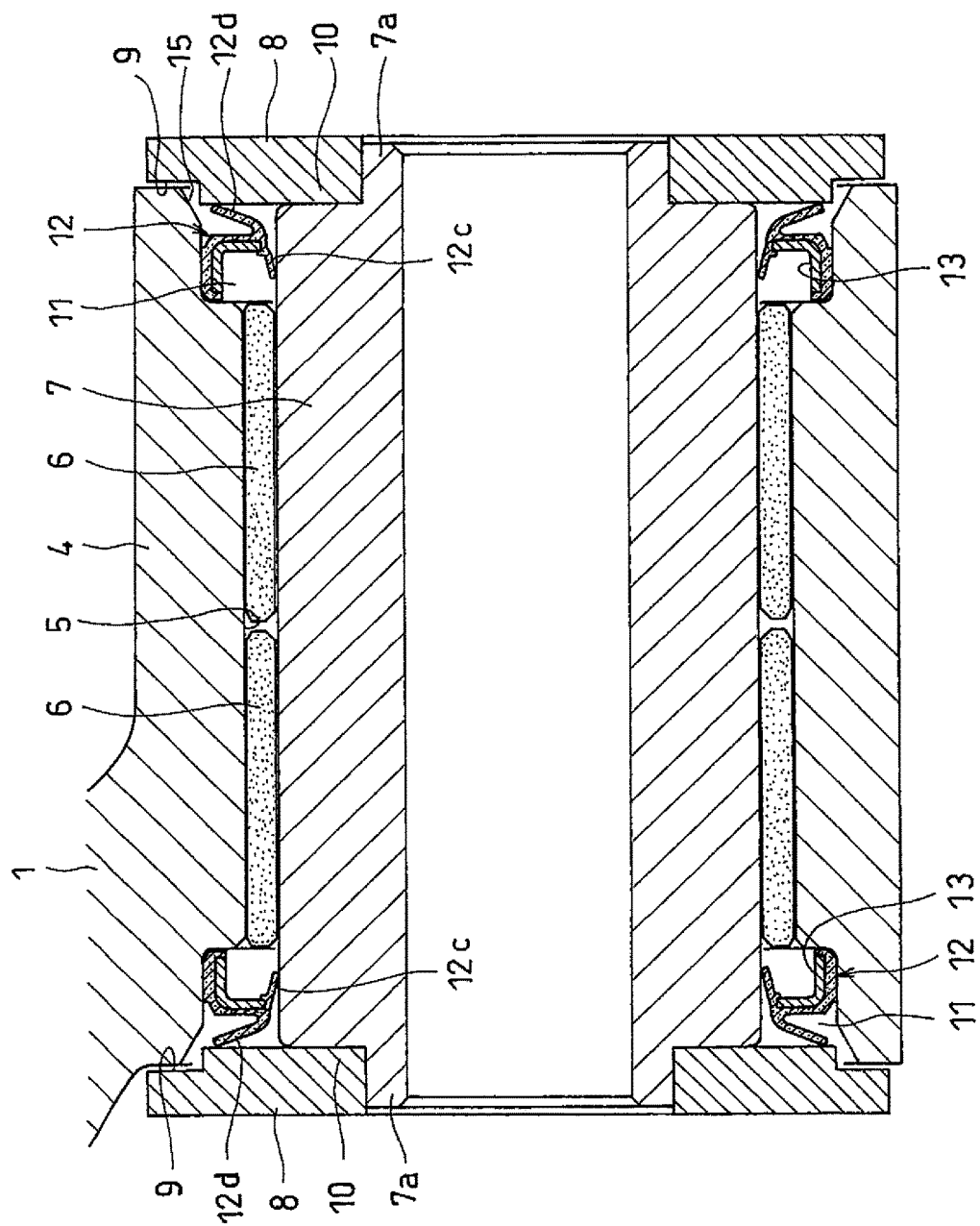
FIG. 3 is an enlarged sectional view of the fulcrum bearing portion of FIG. 2.

As illustrated in FIG. 3, seal receiving recesses 11 having a diameter larger than the diameter of the shaft hole 5 are formed at the respective end portions of the shaft hole 5 of the boss portion 4, and seal members 12 are incorporated in the respective seal receiving recesses 11.

Figure 4:
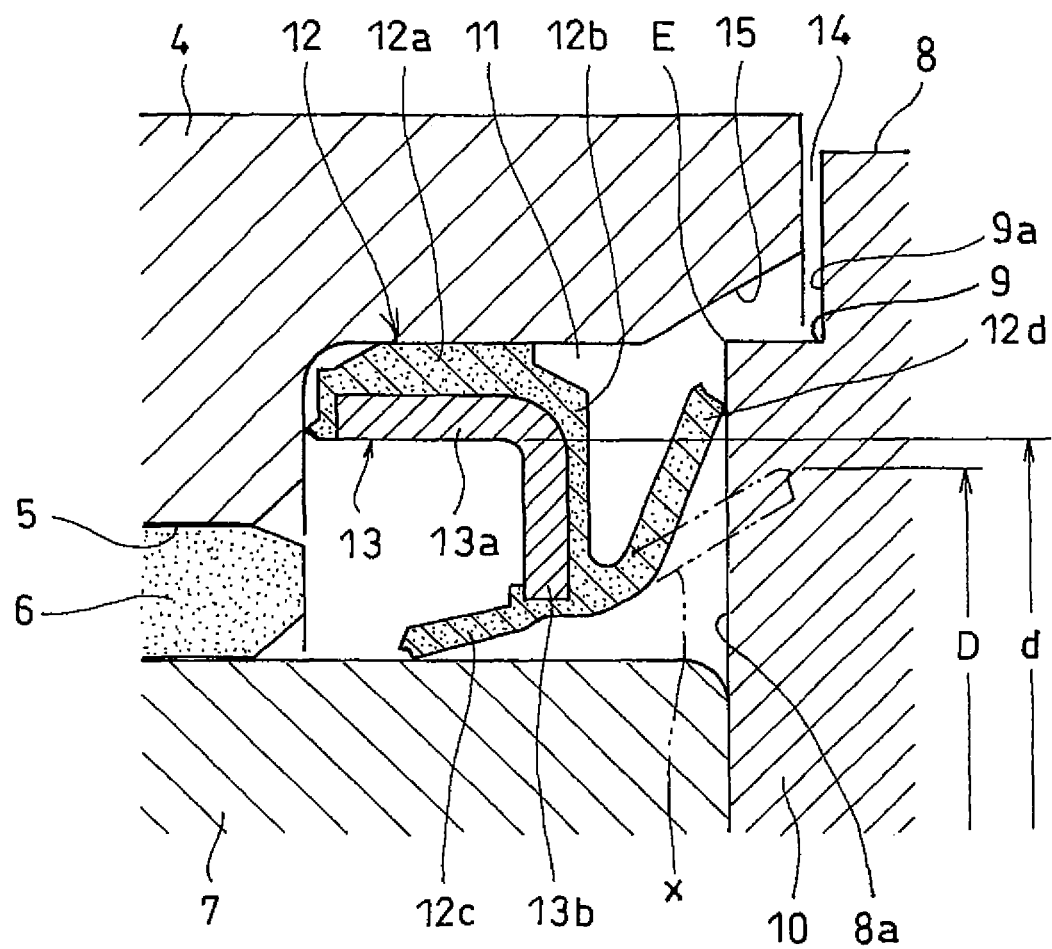
FIG. 4 is an enlarged sectional view of the portion of the fulcrum bearing device in which the seal member of FIG. 3 is incorporated.

As illustrated in FIG. 4, each of the seal members 12 is made of synthetic rubber, and includes a cylindrical portion 12a press-fitted onto the inner diameter surface of the seal receiving recess 11, an inwardly extending annular portion 12b integrally connected with the outer side end of the cylindrical portion 12a, a radial lip 12c provided on the inner peripheral portion of the annular portion 12b, and an axial lip 12d provided on the inner peripheral portion of the outer side surface of the annular portion 12b. As the synthetic rubber of which the seal members 12 are made, rubber having excellent wear resistance is used, such as nitrile rubber, hydrogenated nitrile rubber, ACM rubber, silicon rubber or fluororubber.

Each of the seal members 12 is molded with a seal metal core 13 including a cylindrical portion 13, and an inwardly extending flange 13b provided at one end of the cylindrical portion 13a, and having an L-shaped section. Each of the seal members 12 is reinforced by the seal metal core 13 by molding the seal member 12 such that the outer diameter surface and the end surface of the cylindrical portion 13a are covered by the cylindrical portion 12a of the seal member 12, and the outer side surface of the inwardly extending flange 13b is covered by the annular portion 12b.

The radial lip 12c of each of the seal members 12 is tapered to extend obliquely inwardly inside of the cylindrical portion 12a such that the distal end portion of the lip 12c comes into elastic contact with the outer diameter surface of the sleeve 7. The axial lip 12d of each of the seal members 12 is tapered to extend obliquely outwardly such that the distal end portion of the lip 12d comes into elastic contact with the inner side surface of the washer 8.

The inner side surfaces of the respective washers 8 have outer peripheral portions opposed to the respective end surfaces of the boss portion 4 and formed with annular recessed steps 9. The annular recessed steps 9 define circular protrusions 10 on the inner side surfaces of the respective washers 8. The circular protrusions 10 are fitted in the respective seal receiving recess 11 such that the distal end portions of the axial seal lips 12d of the seal members 12 are in elastic contact with the inner side surfaces of the respective protrusions 10.

If the side surfaces of the recessed steps 9 are kept in contact with the respective end surfaces of the boss portion 4, the friction of the contact portions will resist the pivoting motion of the pulley arm 1. In order to avoid this, axial gaps 14 are defined between the side surfaces of the recessed steps 9 and the respective end surfaces of the boss portion 4. As a result thereof, the boss 4 is movable in the axial direction within the range determined by the axial gaps 14, and any further axial movement of the boss 4 is prevented by the side surfaces of the respective recessed steps 9.

When the boss portion 4 moves in the axial direction within the range of the axial gaps 14, any looseness in the pivotal direction inside of the boss portion 4 could cause run-out of the boss portion 4 so that the outer diameter surfaces of the circular protrusions 10 come into contact with the inner diameter surfaces of the respective seal receiving recesses 11, thereby resisting the movement of the boss portion 4. In order to avoid this, as illustrated in FIG. 4, tapered surfaces 15 are formed at open end portions of the respective seal receiving recesses 11 so that relatively large spaces which allow the axial movement of the boss portion 4 are defined between the tapered surfaces 15 and edges E of the outer peripheries on the side surfaces of the respective circular protrusions 10.

In FIG. 4, the dashed line X illustrates the natural state of the axial lip 12d of each of the seal members 12. The axial lip 12d is configured such that while in the natural state, the distal end outer diameter D of the lip 12d is smaller than the inner diameter d of the cylindrical portion 13a of the seal metal core 13, and when the axial lip 12d is in elastic contact with the side surface of the circular protrusion 10, the distal end outer diameter of the lip 12d is smaller than the outer diameter of the protrusion 10. As a result thereof, it is possible to always keep the distal end portions of the axial lips 12d in contact with the side surfaces of the respective circular protrusions 10.

The fulcrum bearing device for a pulley arm illustrated in the embodiment is configured as described above. Before the washers 8 are fitted onto the respective small diameter tube portions 7a of the sleeve 7, the seal members 12 are incorporated in the respective seal receiving recesses 11. Each of the seal members 12 is incorporated in the seal receiving recess 11 by press-fitting the cylindrical portion 12a, with its open end first, onto the inner diameter surface of the seal receiving recess 11, and bringing the distal end portion of the radial lip 12c into elastic contact with the outer diameter surface of the sleeve 7.

After incorporating the seal members 12, the washers 8 are fitted onto the small diameter tube portions 7a provided at the respective ends of the sleeve 7, with the circular protrusions 10 directed toward the sleeve 7. Since the circular protrusions 10 press the respective axial lips 12d when the washers 8 are fitted in position, the axial lips 12d are elastically deformed, so that the distal end portions of the axial lips 12d are brought into elastic contact with the side surfaces of the respective circular protrusions 10 due to the restoring elastic force of the axial lips 12d.

Since the axial lip 12d of each of the seal members 12 is configured such that when in the natural state, the distal end outer diameter D of the lip 12d is smaller than the inner diameter d of the cylindrical portion 13a of the seal metal core 13, and when the axial lip 12d is kept in elastic contact with the side surface of the circular protrusion 10, the distal end outer diameter of the lip 12d is smaller than the outer diameter of the circular protrusion 10, when the washers 8 are fitted onto the respective small diameter tube portion 7a, it is possible to prevent the distal ends of the axial lips 12d from getting caught between the boss portion 4 and the portions of the respective washers 8 opposed to the boss portion 4. Also, it is possible to always keep the distal end portions of the axial lips 12d in elastic contact with the side surfaces of the respective circular protrusions 10.

After mounting the seal members 12 and the washers 8, the bolt 20 is inserted through the sleeve 7, screwed into the engine block 30, and tightened, so that the sleeve 7 and the washers 8 are fixed in position and thus the pulley arm 1 is supported so as to be pivotable about the sleeve 7.

FIGS. 1 and 2 illustrate the state in which the pulley arm 1 is pivotally supported and the adjusting force of the hydraulic auto-tensioner 3 is being applied to the pulley arm 1 to adjust the tension of the belt B. In this state, when the tension of the belt B changes, the pulley arm 1 pivots about the sleeve 7. As a result thereof, heat is generated by frictional contact in the sliding bearings 6 and thus temperature rises in the interior of the boss portion 4, thereby causing pressure to rise in the interior of the boss portion 4.

At this time, since the radial lips 12c of the respective seal members 12 extend obliquely inwardly, the radial lips 12c are elastically deformed by the pressure in the interior of the boss portion 4 so as to be radially compressed, thereby more strongly pressing the distal ends of the respective radial lips 12c against the outer diameter surface of the sleeve 7. As a result thereof, it is possible to secure excellent seal performance in the distal end portions of the respective radial seal lips 12c kept in contact with the sleeve 7, and thus to stably prevent foreign objects from going inside.

After the engine has stopped, when the temperature inside the boss portion 4 lowers and as a result, the pressure inside the boss portion 4 drops below the external pressure, the contact pressure of the radial lips 12 against the outer diameter surface of the sleeve 7 lowers. This could deteriorate the seal performance of the radial lips 12c. However at this time, the axial lips 12d are elastically deformed toward the respective washers 8 by external pressure, so as to be strongly brought into contact with the side surfaces of the respective circular protrusions 10. Therefore, even when pressure in the interior of the boss portion 4 has become lower than external pressure, it is possible to secure excellent seal performance, and thus to stably prevent foreign objects from going inside.

Figure 15:
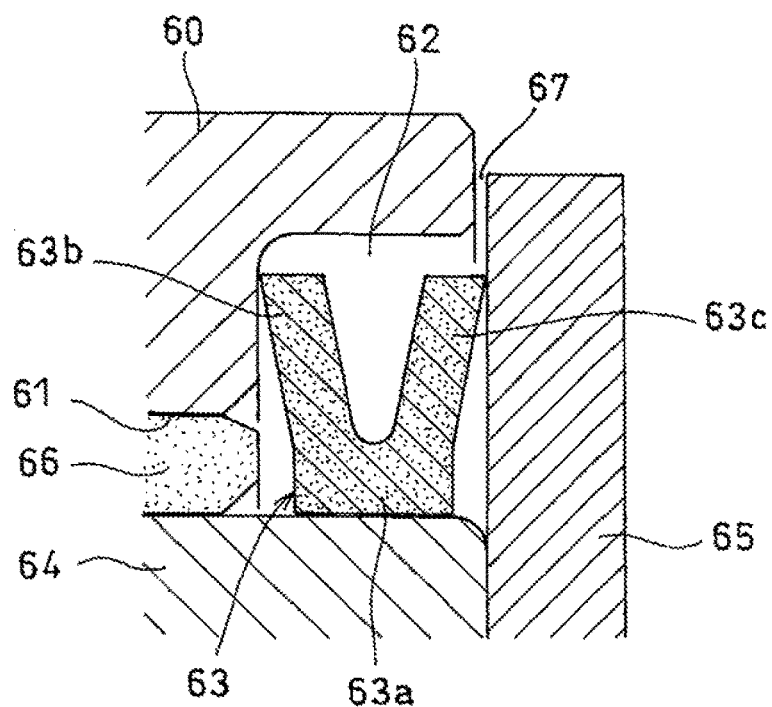
FIG. 15(a) is a sectional view of a portion of a conventional fulcrum bearing device.
FIG. 15(b) is a sectional view illustrating the state in which a seal member is elastically deformed due to the rise of interior pressure.
Figure 15:
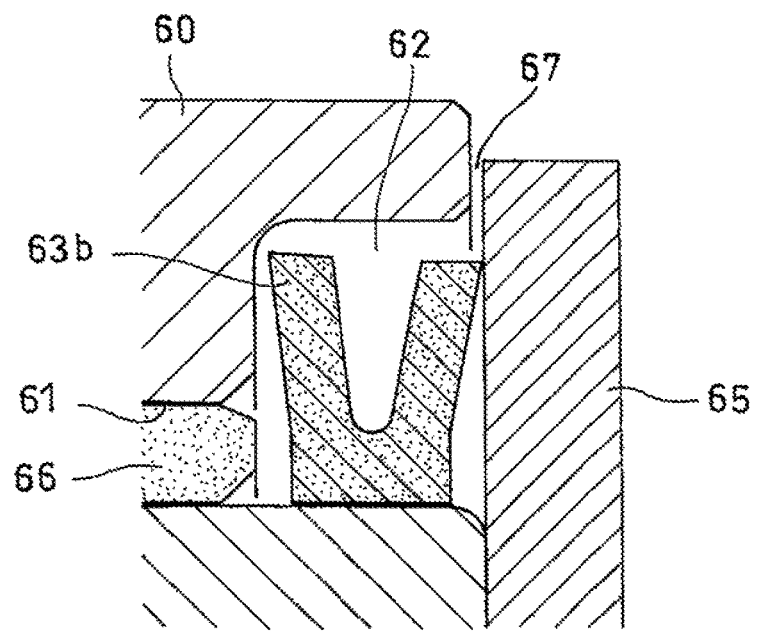

In a conventional fulcrum bearing device for a pulley arm illustrated in FIG. 15, as the boss portion 60 of the pulley arm and the sleeve 64 rotate relative to each Other about their common axis, the lip portion 63b of each of the seal members 63 comes into sliding contact with the side surface of a recess 62 formed in the boss portion 60, so that it is impossible to avoid the wear of the lip portion 63b and thus the seal performance of the seal members 63 deteriorates as time passes.

Figure 5:
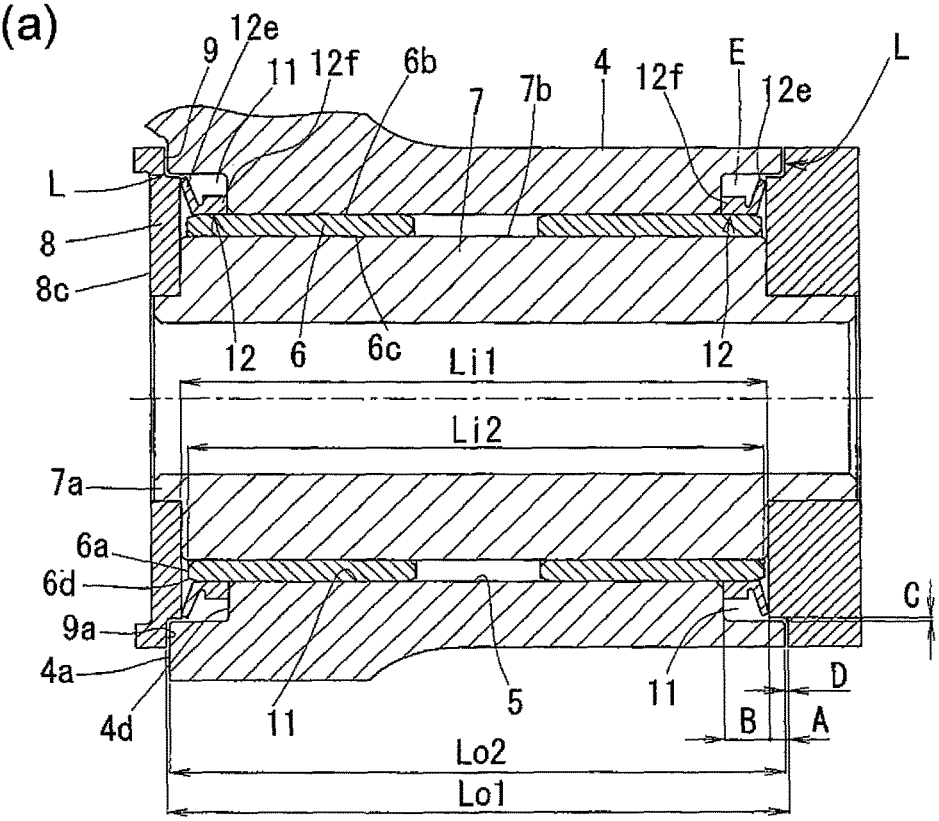
FIG. 5(a) is a sectional view of a different fulcrum bearing device.
FIG. 5(b) is an enlarged sectional view of a portion of the fulcrum bearing device of FIG. 5 (a).
Figure 5:
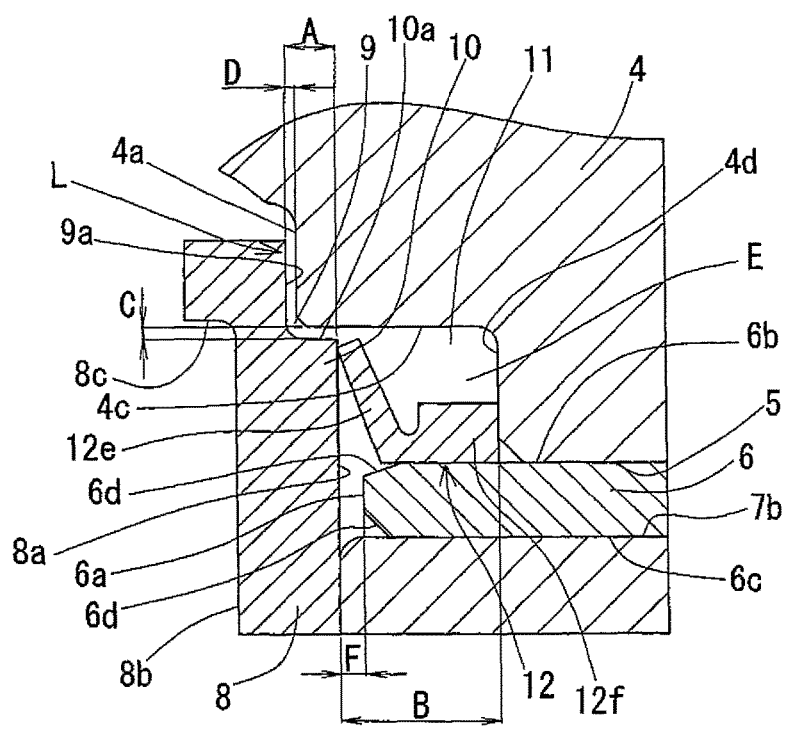
Figure 6:
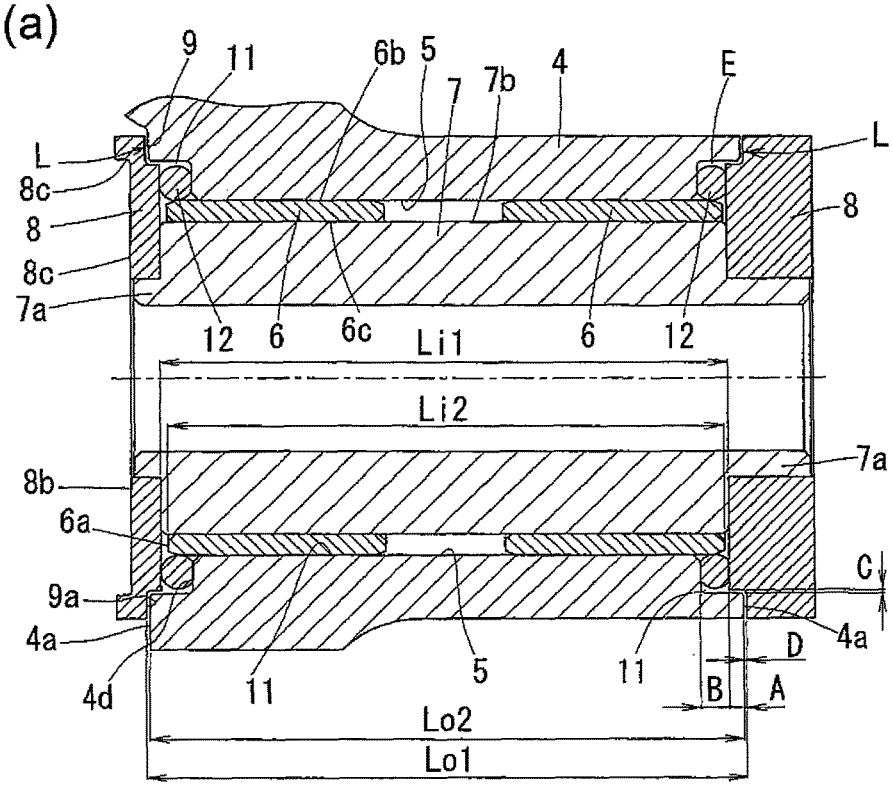
FIG. 6(a) is a sectional view of a fulcrum bearing device different from the fulcrum bearing device of FIG. 5.
FIG. 6(b) is a sectional view of a fulcrum bearing device different from the fulcrum bearing device of FIG. 5.
Figure 6:
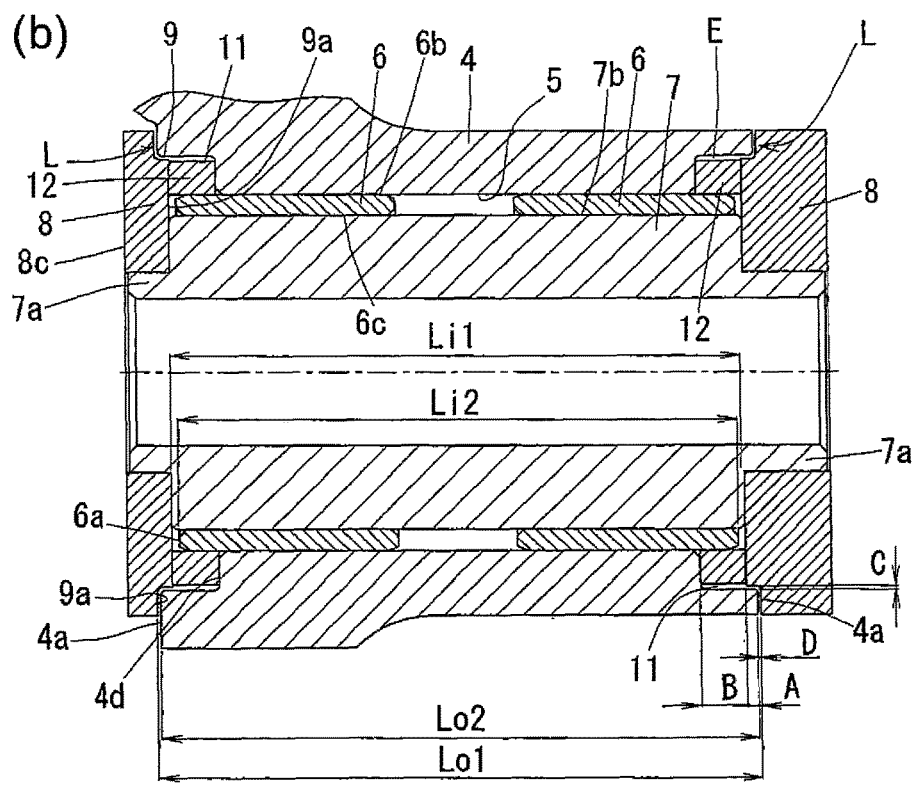

In order to prevent the deterioration of the seal performance of the above seal members, in the fulcrum bearing device illustrated in FIGS. 5 and 6, the annular recessed steps 9 are formed in the outer peripheral portions of the inner side surfaces of the respective washers 8, the outer peripheral portions thereof being opposed to respective end surfaces 4a of the boss portion 4, the circular protrusions 10, formed inside of the respective recessed step 9, are inserted in the respective seal receiving recesses 11 of the boss portion 4 so that labyrinth seals L are defined between the boss portion 4 and the portions of the respective washers 8 opposed to the boss portion 4, and seal contact surface portions (inner side surface portions) 8a of the washers 8 with which the respective seal members 12 come into contact are located radially and axially inwardly of the respective recessed steps 9.

The labyrinth seals L are defined radially outwardly of the respective seal members 12 as described above, so as to exert seal performance. Therefore, it is possible to prevent the wear of the seal members 12 which would occur due to the sliding contact of the seal members 12 with the boss portion 4, and thus to maintain the seal performance of the seal members 12 for a long period of time.

In the fulcrum bearing device illustrated in FIGS. 5(a) and 5(b), the outer side surface 8b of the washer 8 on the side of the sleeve 7 from which the bolt 20 is inserted into the sleeve 7 is formed with a recess 8c in which the head of the bolt 20 fits. By fitting the head of the bolt 20 in the recess 8c of this washer 8, it is possible to reduce the height of the portion of the head protruding from the washer, and thus the height of the portion of the bolt 20 protruding from the boss portion 4.

The seal members 12 incorporated in the respective seal receiving recesses 11 of the boss portion 4 are arranged so as to abut axially outwardly facing side surfaces 4d of the seal receiving recesses 11. Also, the seal members 12 are fitted on outer diameter surfaces 6b of the sliding bearings 6 at the axially outer end portions of the respective sliding bearings 6.

The seal members 12 are annular members each formed to be continuous over the entire circumference thereof. The seal members 12 are each retained by the washer 8 fixed to the sleeve 7, between the inner side surface portion 8a of the washer 8 and the side surface 4d of the seal receiving recess 11 formed in the boss portion 4.

A portion of each labyrinth seal L is defined by the gap between a side surface 9a of the recessed step 9 formed in the washer 8 and the end surface 4a of the boss portion 4.

As illustrated in FIG. 5 (a), the washers 8 are located on both sides of the sleeve 7 such that the distance Lo1 between the axially inwardly facing side surfaces 9a of the respective recessed steps 9 is longer than the distance Lo2 between the end surfaces 4a formed at the respective axial end portions of the boss portion 4 so as to be opposed to the respective side surfaces 9a. As a result thereof, gaps D are defined between the end surfaces 4a of the boss portion 4 and the side surfaces 9a of the respective recessed steps 9.

Also, a gap C is defined between the outer diameter surface 10a of the circular protrusion 10 of each washer 8 and the inner diameter surface 4c of the seal receiving recess 11 opposed to the surface 10a. Furthermore, a space E is defined axially inwardly of the gap C so that the seal member 12 is arranged in the space E. The gaps C and D and the space E form the labyrinth seal L.

The gaps C, defined between the outer diameter surfaces 10a of the circular protrusions 10 of the washers 8 and the inner diameter surfaces 4c of the respective seal receiving recess 11 opposed to the surfaces 10a, are larger than radial gaps of the sliding bearings 6 disposed between the boss portion 4 and the sleeve 7. As used herein, the "radial gaps of the sliding bearings 6 disposed between the boss portion 4 and the sleeve 7" refer to gaps having radial dimensions obtained by subtracting the radius of an outer diameter surface 7b of the sleeve 7 from the radii of the inner diameter surfaces 6c of the sliding bearing 6. Since the radial gaps C, defined between the boss portion 4 and the respective washers 8, are larger than the radial gaps of the sliding bearings 6, it is possible to prevent the rotatable boss portion 4 from coming into contact with the fixed washers 8.

As described above, the inner side surface portions 8a of the washers 8 which the respective seal members 12 abut are located radially and axially inwardly of the respective recessed steps 9. Since the labyrinth seals L, defined radially outwardly of the respective seal members 12, exert seal performance, it is possible to reduce the wear of the seal members 12 which would occur due to the sliding contact of the seal members 12 with the pulley arm 1, etc., and thus to maintain the seal performance of the seal members 12 for a long period of time.

As illustrated in FIG. 5 (b), the inner side surface of each washer 8 is stepped such that the inner side surface portion 8a is located radially inwardly of the recessed step 9, and also located axially inwardly of the end surface 4a of the boss portion 4.

Therefore, when the washers 8 are not mounted to the sleeve 7 yet, the seal members 12 are configured not to protrude in the axial direction from the respective end surfaces 4a of the boss portion 4, and when the washers 8 are fixed onto the sleeve 7, the seal members 12 are compressed between the inner side surface portions 8a of the washers 8 and the side surfaces 4d of the respective seal receiving recesses 11, so as to be retained therebetween. In this way, the seal members 12 are protected when the washers 8 are fixed onto the sleeve 7.

In this embodiment, the washers 8 are formed by press working. The inner side surface portion 8a of each washer 8, with which the seal member 12 comes into contact, may be formed by cutting or grinding. The seal members 12 may be made of rubber, such as H-NBR or fluoro rubber.

In order to define the labyrinth seals L between the recessed steps 9 of the washers 8 and the respective end surfaces 4a of the boss portion 4, it is necessary to determine the distance Lot between the axially inwardly facing side surfaces 9a of the recessed steps 9 located on both axial sides of the boss portion 4, and the distance Lo2 between the end surfaces 4a of the boss portion 4 opposed to the respective side surfaces 9a such that the difference between the distances Lo1 and Lo2 is shorter than the axially protruding length A of the circular protrusion 10 of each of the washers 8.

The distance Li1 between the inner side surface portions 8a of the washers 8 located on both axial sides of the sleeve 7 is predetermined to be longer than the distance Li2 between end surfaces 6a formed at the axially outward ends of the respective sliding bearings 6 so as to be opposed to the respective inner side surfaces 8a. As a result thereof, gaps F are defined between the inner side surfaces 8a of the circular protrusions 10 and the end surfaces 6a of the respective sliding bearings 6.

By determining the sizes of the component parts of the bearing device so as to satisfy the formula "Li1−Li2>Lo1−Lo2", when some of the component parts move in the axial direction relative to each other, the boss portion 4 comes into contact with the washers 8 before the end surfaces 6a of the respective sliding bearings 6 come into contact with the washers 8. Therefore, it is possible to maintain the gaps forming the labyrinth seals L.

Figure 7:
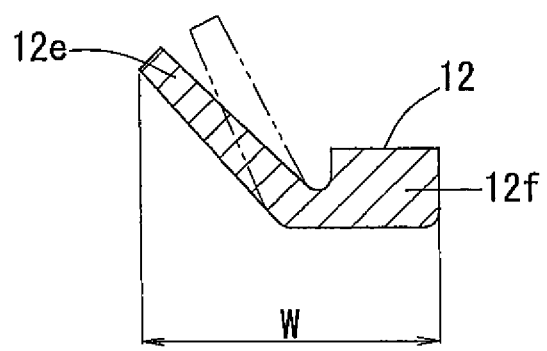
FIG. 7 is a sectional view of the seal member illustrated in FIGS. 5(a), 5(b), with the seal member in its natural state.

The axial width W of each seal member 12 in its natural state illustrated in FIG. 7 is predetermined to satisfy the formula "Lo1−Lo2+B<W", where Lo1 is the distance between the side surfaces 9a of the respective recessed steps 9, Lo2 is the distance between the end surfaces 4a formed at the respective ends of the boss portion 4, and B is the axial width between the side surface 8a of the circular protrusion 10 and the side surface 4d of the seal receiving recess 11.

Since the axial width B of the space in which the seal member 12 is received with the washer 8 fitted on the sleeve 7 is made shorter than the axial width W of the seal member 12 in its natural state, it is possible to enhance the seal performance of the seal members 12.

Though the seal members 12 may be made of any material provided that the seal members 12 can exert a predetermined seal performance, the seal members 12 are made of rubber in this embodiment. The seal members 12 are fitted on the outer diameter surfaces 6b of the respective sliding bearings 6 with an interference.

Also in this embodiment, each of the seal members 12 is a one-lip seal which includes an annular base portion 12f fitted on the outer diameter surface 6b of the sliding bearing 6, and a single lip portion 12e extending radially outwardly from the base portion 12f. The lip portions 12e of the seal members 12 come into contact with seal abutment portions 31 of the respective washers 8.

Namely, since the inner surface of each of the washers 8 is stepped, it is possible to define the labyrinth seals L with the seal members 12 retained between the boss portion 4 and the respective washers 8. As a result thereof, since the labyrinth seals L can exert seal performance to some extent, one-lip (single-lip) seals can be used as the seal members 12.

Each of the sliding bearings 6 has chamfered portions 6d formed on the ridgeline portion between the outer diameter surface 6b and the axially outwardly facing end surface 6a of the bearing 6, and on the ridgeline portion between the inner diameter surface 6c and the axially outwardly facing end surface 6a, respectively.

Since the chamfered portions 6d are formed thereon as described above, it is possible to smoothly mount the seal members 12 onto the outer peripheries of the respective sliding bearings 6. Furthermore, since the chamfered portions 6d are formed thereon, it is also possible to prevent the seal members 12 from getting caught between the sliding bearings 6 and the respective washers 8, etc.

In this embodiment, the axially outwardly facing end surface 6a of each of the sliding bearings 6 is located axially outwardly of the side surface 4d of the seal receiving recess 11 of the boss portion 4. As a result thereof, it is possible to arrange the seal members 12 and the sliding bearings 6 such that the seal members 12 overlap the respective bearings 6 in the axial direction, and thus to secure a sufficient length as for the axial length of each of the sliding bearings 6. It is especially preferable to arrange the sliding bearings 6 and the seal members 12 such that each sliding bearing 6 guides two-thirds or more of the corresponding seal member 12 with respect to the axial width of the seal member 12. In this embodiment, the substantially entire length of the base portion 12f of each of the seal members 12 is guided by the sliding bearing 6.

In this embodiment, the seal members 12 each includes the annular base portion 12f, and the lip portion 12e extending radially outwardly from the base portion 12f and coming into sliding contact with the inner side surface 8a of the washer 8. However for example, each of the seal members 12 may be an O-ring having a circular section as illustrated in FIG. 6(a), or may be an annular member having a rectangular section as illustrated in FIG. 6(b).

In the conventional fulcrum bearing device for a pulley arm illustrated in FIG. 15, an axial gap 67 is defined between the boss portion 60 of the pulley arm and each washer 65 opposed to the boss portion 60, the boss portion 60 is configured to minutely vibrate in the axial direction within the range of the axial gap 67. Since each seal member 63 is incorporated between the boss portion 60 configured to minutely vibrate and the fixed washer 65, when the boss portion 60 minutely vibrates, pressure is repeatedly applied to the seal member 63 by the boss portion 60 and by the sliding bearing 66 which is fitted on the inner diameter surface of the boss portion 60 and which vibrates together with the boss portion 60. As a result thereof, the seal member 63 tends to plastically deform due to the repeatedly applied pressure, and thus the seal member 63 might not be able to maintain its seal performance.

In order to overcome such a problem, in each of the fulcrum bearing devices illustrated in FIGS. 8 through 14, the seal members 12 received in the respective seal receiving recesses 11 of the boss portion 4 are supported by the fulcrum shaft portion defined by the sleeve 7 and the washers 8 and thus are brought into close contact with the respective washers 8, gaps 17 larger than the axial gaps 14, defined between the boss portion 4 and the respective washers 8 opposed to the boss portion 4, are defined between the inner side surfaces of the seal members 12 and the side surfaces 4d of the respective seal receiving recesses 11, and the distal ends of seal lips 12h, 45, or 49 provided on the outer peripheries of the respective seal members 12 are brought into elastic contact with the inner diameter surfaces of the respective seal receiving recesses 11.

Figure 8:
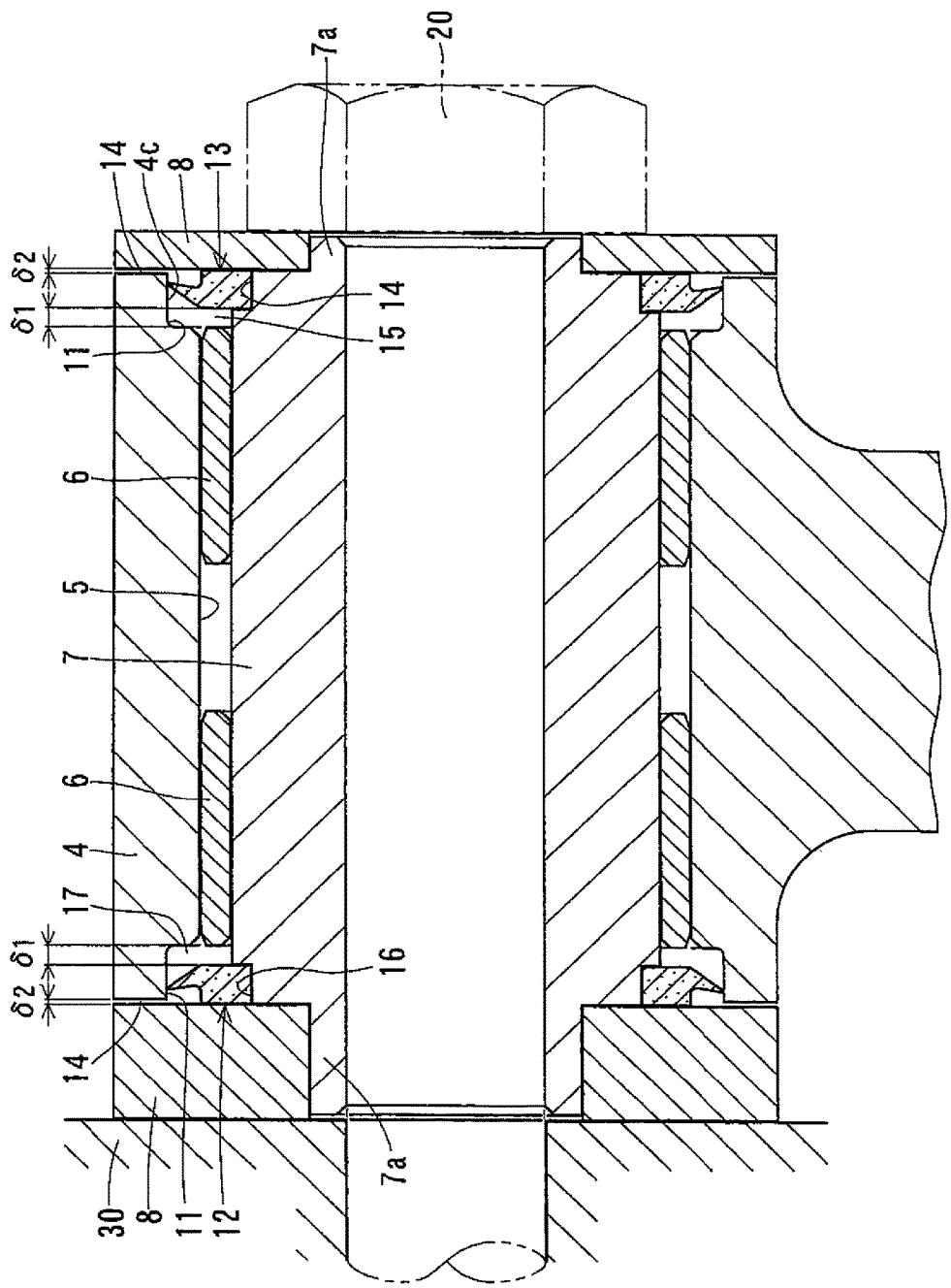
FIG. 8 is a sectional view of a still different fulcrum bearing device.
Figure 9:
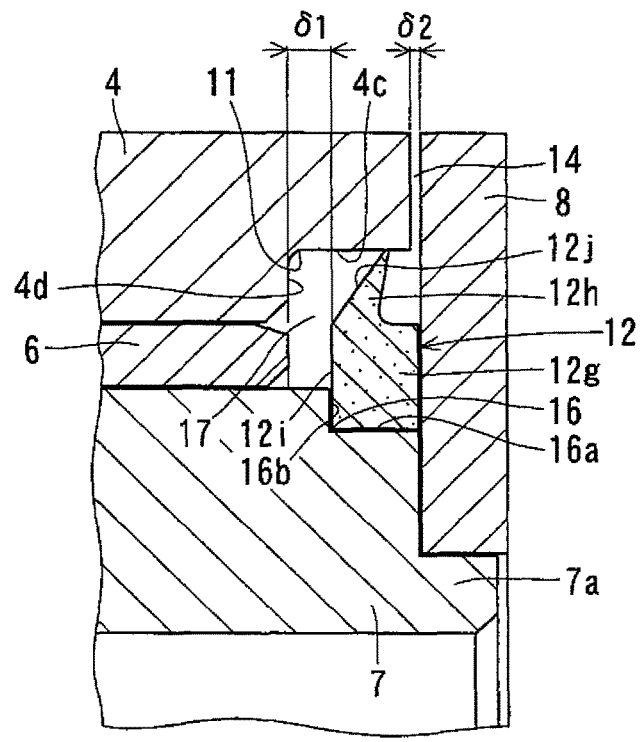
FIG. 9 is an enlarged sectional view of the portion of the fulcrum bearing device in which the seal member of FIG. 8 is incorporated.

In FIGS. 8 and 9, the seal members 12 each includes an annular portion 12g having a rectangular section, and the seal lip 12h provided on the outer diameter surface of the annular portion 12g and formed on one side thereof with a tapered surface 12j.

Each of the seal members 12 is mounted in position with the annular portion 12g fitted on a cylindrical surface 16a of one of recessed steps 16 formed on the outer diameter surface of the sleeve 7 at the respective end portions of the sleeve 7, while being held by the washer 8 and a side surface 16b of the recessed step 16 from both sides in the axial direction such that the outer side surface of the annular portion 12g is kept in close contact with the inner side surfaces of the respective washers 8, and with the distal end portion of the seal lip 12h kept in elastic contact with the inner diameter surface 4c of the seal receiving recess 11.

When each seal member 12 is incorporated therein as described above, the gap 17 is defined between the inner side surface 12i of the seal member 12 and the side surface 4d of the seal receiving recess 11. The size of the gap 17 is predetermined to satisfy the formula "$\delta_1 > \delta_2$", where $\delta_1$ is the size of the gap 17, and $\delta_2$ is the size of the axial gap 14, defined between the boss portion 4 and the washer 8 opposed to the boss portion 4.

With this arrangement, in which the seal members 12 are supported by the fulcrum shaft portion defined by the sleeve 7 and the washers 8 and thus are brought into close contact with the inner side surfaces of the respective washers 8, the gaps 17 larger than the axial gaps 14, defined between the boss portion 4 and the respective washers 8 opposed to the boss portion 4, are defined between the inner side surfaces 12i of the seal members 12 and the side surfaces 4d of the respective seal receiving recesses 11, even when the boss portion 4 minutely vibrates within the range of the axial gaps 14, pressure is not applied to the seal members 12. As a result thereof, since the seal members 12 do not plastically deform, it is possible to secure excellent seal performance of the seal members 12 for a long period of time.

Figure 10:
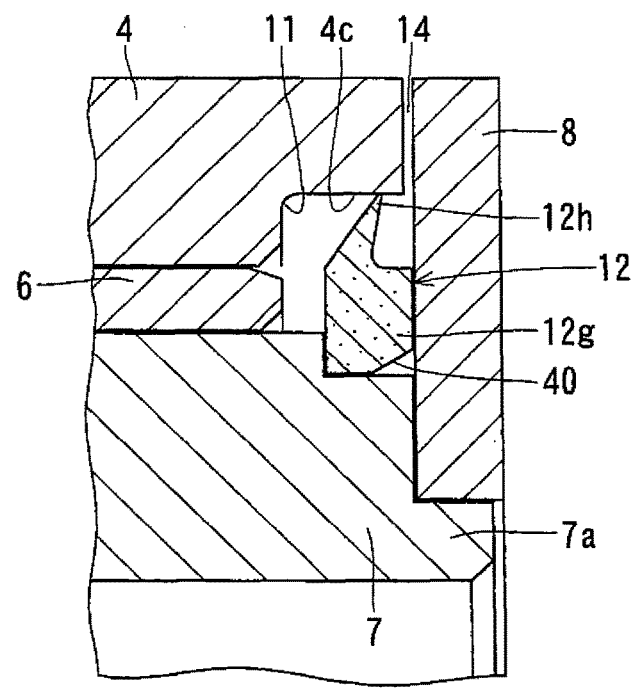
FIG. 10 is a sectional view illustrating a different seal member.
Figure 11:
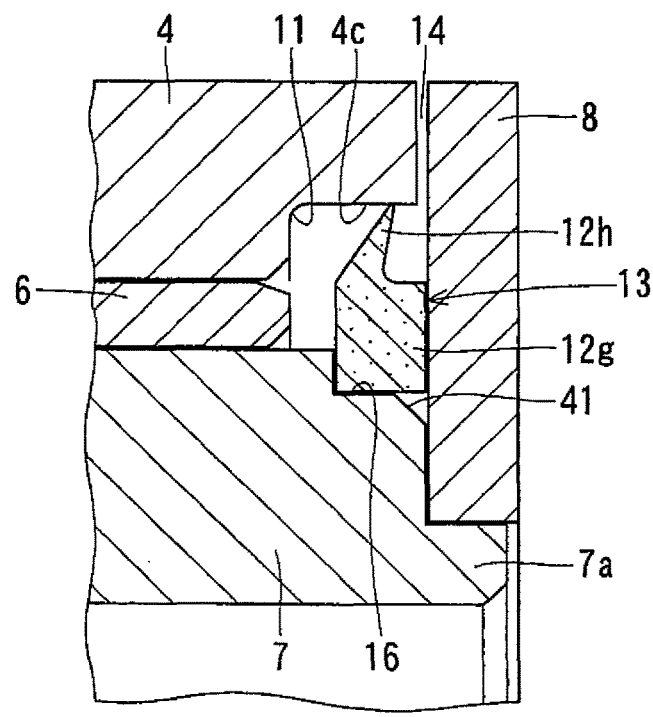
FIG. 11 is a sectional view illustrating a different sleeve.

If a chamfered portion 40 is formed on the inner diameter surface of each of the seal members 12 at the edge of the outer side end thereof as illustrated in FIG. 10, or a chamfered portion 41 is formed on the cylindrical surface 16a of each of the recessed steps 16 at the edge of the outer side end thereof as illustrated in FIG. 11, when the seal members 12 are incorporated and thereafter the washers 8 are attached, it is possible to prevent the inner peripheral portions of the outer side surfaces of the respective seal members. 12 from getting caught between the sleeve 7 and the respective washers 8 opposed to the sleeve 7.

In FIG. 9, the recessed steps 16 are formed at the respective end portions of the sleeve 7 so that the seal members 12 are supported by the cylindrical surfaces 16a of the respective recessed steps 16. However, as illustrated in FIG. 12, cylindrical portions 42 may be formed on the inner side surfaces of the respective washers 8 so that the seal members 12 are fitted onto and supported by the respective cylindrical portions 42.

As described above, by providing each of the washers 8 with the cylindrical portion 42 onto which the seal member 12 is fitted and by which the seal member 12 is supported, it is possible to attach the seal members 12 onto the respective cylindrical portions 42 before the washers 8 are attached onto the sleeve 7. This makes it easier to mount the seal members 12.

Figure 12:
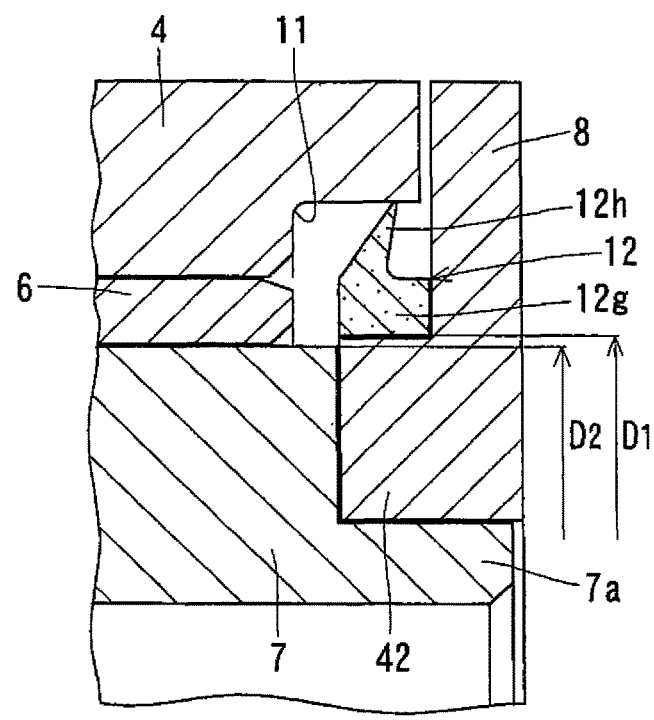
FIG. 12 is a sectional view illustrating how a seal member is supported as another example.

If the outer diameter D1 of the cylindrical portion 42 is larger than the outer diameter D2 of the sleeve 7 (i.e., D1>D2) as illustrated in FIG. 12, when the washer 8 is attached onto the sleeve 7, it is possible to prevent the inner peripheral portion of the inner side surface of the seal member 12 from getting caught between the sleeve 7 and the cylindrical portion 42 opposed to the sleeve 7.

In the arrangement illustrated in FIG. 12, the seal performance of the seal member 12 may be secured by bringing the seal member 12 into close contact with the inner side surface of the washer 8 and bringing the inner diameter surface of the seal member 12 into close contact with the outer diameter surface of the cylindrical portion 42. Also, the seal performance of the seal member 12 may be secured by bringing only the inner diameter surface of the seal member 12 into close contact with the outer diameter surface of the cylindrical portion 42.

FIG. 9 illustrates, as the seal member 12, a seal member made of rubber and including the annular portion 12g having a rectangular section, and the seal lip 12h provided on the outer diameter surface of the annular portion 12g. However, the seal member 12 is not limited to such a seal member.

Figure 13:
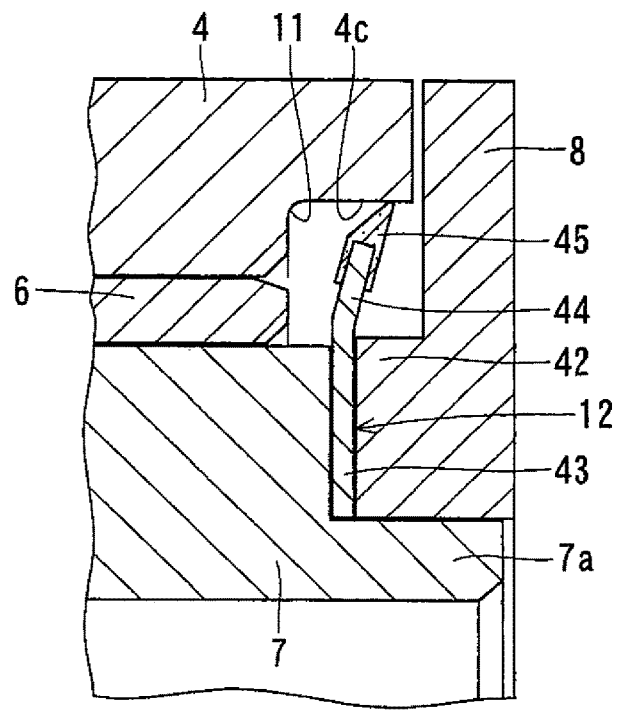
FIG. 13 is a sectional view illustrating a still different seal member.
Figure 14:
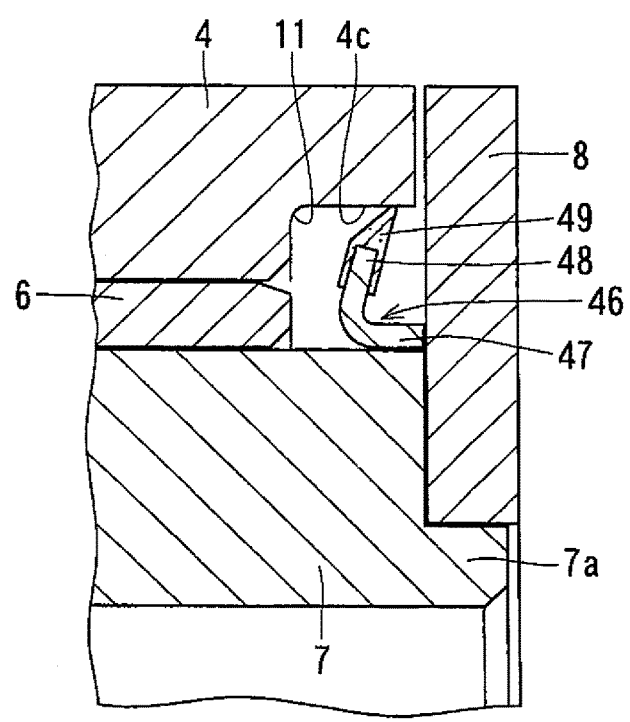
FIG. 14 is a sectional view illustrating a still different seal member.

FIGS. 13 and 14 illustrate still different seal members 12. The seal member 12 illustrated in FIG. 13 includes an annular seal metal core 43 made of a thin metal plate and formed on the outer peripheral portion thereof with a tapered portion 44, and the seal lip 45 made of rubber and fixedly attached to the outer periphery of the tapered portion 44. In this arrangement, the inner peripheral portion of the seal metal core 43 is held by the end surface of the sleeve 7 and the cylindrical portion 42 formed on the inner side surface of the washer 8, namely held from both sides in the axial direction, so that the outer side surface of the seal metal core 43 is kept in close contact with the end surface of the cylindrical portion 42, and the seal lips 45 is kept in elastic contact with the inner diameter surface 4c of the seal receiving recess 11.

The seal member 12 illustrated in FIG. 14 includes a seal metal core 46 made of a thin metal plate and having an L-shaped section, the seal metal core 46 being provided with cylindrical portion 47 and an obliquely extending flange 48 formed at one end of the cylindrical portion 47, and the seal lip 49 made of rubber and bonded on the outer peripheral portion of the flange 48. In this arrangement, the cylindrical portion 47 of the seal metal core 46 is fitted on the outer diameter surface of the end portion of the sleeve 7, the outer end surface of the cylindrical portion 47 is kept in close contact with the inner side surface of the washer 8, and the seal lip 49 is kept in elastic contact with the inner diameter surface 4c of the seal receiving recess 11.

DESCRIPTION OF REFERENCE NUMERALS

1: pulley arm
2: tension pulley
4: boss portion
5: shaft hole
7: sleeve
8: washer
9: recessed step
10: circular protrusion
11: seal receiving recess
12: seal member
12a: cylindrical portion
12b: annular portion
12c: radial lip
12d: axial lip
13: seal metal core
13a: cylindrical portion
13b: inwardly extending flange
14: axial gap
15: tapered surface
20: bolt
30: engine block (to which pulley arm 1 is attached)

The invention claimed is:

1. A fulcrum bearing device for a pulley arm,
wherein a sleeve is inserted in a shaft hole formed in a boss portion of the pulley arm,
wherein washers are attached to two respective end portions of the sleeve so as to be opposed to two respective end surfaces of the boss portion in an axial direction,
wherein the sleeve is fixed in position by means of a bolt which is inserted through the sleeve, screwed into a member to which the pulley arm is attached, and tightened, whereby the pulley arm is pivotally supported,
wherein the shaft hole of the boss portion is formed, at two respective end portions of the shaft hole, with seal receiving recesses having diameters larger than a diameter of the shaft hole,
wherein seal members are incorporated in the respective seal receiving recesses, so as to prevent a foreign object from going into the boss portion from outside,
wherein each of the seal members is made of an elastic material, and comprises a cylindrical portion press-fitted on an inner diameter surface of the seal receiving recess, an inwardly extending annular portion integrally connected with an outer side end of the cylindrical portion, and a tapered radial lip extending obliquely inwardly from an inner periphery of the annular portion inside of the cylindrical portion, and having a distal end portion kept in elastic contact with an outer diameter surface of the sleeve,
wherein the annular portion of each of the seal members has an outer side surface provided, on an inner peripheral portion of the outer side surface with an axial lip extending obliquely outwardly and having a distal end portion kept in elastic contact with an inner side surface of a corresponding one of the washers,
wherein each of the washers is formed with an annular recessed step in the inner side surface of the washer at an outer peripheral portion thereof opposed to a corresponding one of the end surfaces of the boss portion, the annular recessed step defining, inside the annular recessed step, a circular protrusion fitted in a corresponding one of the seal receiving recesses,
wherein the annular recessed step has a side surface opposed to the respective end surface of the boss portion with a gap defined between the respective side surface and the respective end surface of the boss portion, and configured to restrict an axial movement of the pulley arm, and
wherein the axial lip is kept in elastic contact with a side surface of the respective circular protrusion.

2. The fulcrum bearing device according to claim 1, wherein the seal members are each reinforced by a seal metal core having an L-shaped section, and including a cylindrical portion having an outer diameter surface and an end surface which are covered by the cylindrical portion of a corresponding one of the seal members, and an inwardly extending flange provided at one end of the cylindrical portion of the seal metal core, and having an outer side surface covered by the annular portion of the corresponding one of the seal members.

3. The fulcrum bearing device according to claim 1, wherein the axial seal lip is configured such that when the axial lip is in a natural state, a distal end outer diameter of the axial lip is smaller than an inner diameter of the cylindrical portion of the seal metal core, and when the axial lip is kept in elastic contact with the side surface of the circular protrusion, the distal end outer diameter of the axial lip is smaller than an outer diameter of the circular protrusion.

4. The fulcrum bearing device according to claim 1, wherein each of the seal members is made of a synthetic rubber comprising any one of nitrile rubber, hydrogenated nitrile rubber, ACM rubber, silicon rubber and fluororubber.

5. A fulcrum bearing device for a pulley arm,
wherein a sleeve is inserted in a shaft hole formed in a boss portion of the pulley arm,
wherein washers are attached to two respective end portions of the sleeve so as to be opposed to two respective end surfaces of the boss portion in an axial direction,
wherein the sleeve is fixed in position by means of a bolt which is inserted through the sleeve, screwed into a member to which the pulley arm is attached, and tightened, whereby the pulley arm is pivotally supported, wherein the shaft hole of the boss portion is formed, at two respective end portions of the shaft hole, with seal receiving recesses having diameters larger than a diameter of the shaft hole, wherein seal members are incorporated in the respective seal receiving recesses, so as to prevent a foreign object from going into the boss portion from outside, wherein each of the seal members is made of an elastic material, and comprises a cylindrical portion press-fitted on an inner diameter surface of the seal receiving recess, an inwardly extending annular portion integrally connected with an outer side end of the cylindrical portion, and a tapered radial lip extending obliquely inwardly from an inner periphery of the annular portion inside of the cylindrical portion, and having a distal end portion kept in elastic contact with an outer diameter surface of the sleeve, wherein the annular portion of each of the seal members has an outer side surface provided, on an inner peripheral portion of the outer side surface, with an axial lip extending obliquely outwardly and having a distal end portion kept in elastic contact with an inner side surface of a corresponding one of the washers, wherein each of the washers is formed with an annular recessed step in the inner side surface of the washer at an outer peripheral portion thereof opposed to a corresponding one of the end surfaces of the boss portion, the annular recessed step defining, inside the annular recessed step, a circular protrusion fitted in a corresponding one of the seal receiving recesses, wherein the annular recessed step has a side surface opposed to the respective end surface of the boss portion with a gap defined between the respective side surface and the respective end surface of the boss portion, and configured to restrict an axial movement of the pulley arm, and wherein the axial lip is kept in elastic contact with a side surface of the respective circular protrusion, and wherein each of the seal receiving recesses has an open end formed with a tapered surface at an inner peripheral portion of the open end such that a gap is defined between the tapered surface and an outer peripheral edge of a corresponding one of the circular protrusions.

* * * * *